United States Patent
Yun et al.

(10) Patent No.: US 9,664,208 B2
(45) Date of Patent: May 30, 2017

(54) ENGINE CONTROL METHOD OF CONSTRUCTION MACHINE

(75) Inventors: Seong-Geun Yun, Changwon-si (KR);
Sung-Bok Park, Changwon-si (KR);
Se-Rib Jee, Busan (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 376 days.

(21) Appl. No.: 14/368,909

(22) PCT Filed: Dec. 28, 2011

(86) PCT No.: PCT/KR2011/010209
§ 371 (c)(1),
(2), (4) Date: Jun. 26, 2014

(87) PCT Pub. No.: WO2013/100218
PCT Pub. Date: Jul. 4, 2013

(65) Prior Publication Data
US 2014/0331661 A1   Nov. 13, 2014

(51) Int. Cl.
*F16D 31/02*   (2006.01)
*F15B 11/00*   (2006.01)
(Continued)

(52) U.S. Cl.
CPC ............ *F15B 11/00* (2013.01); *E02F 9/2066* (2013.01); *E02F 9/2246* (2013.01);
(Continued)

(58) Field of Classification Search
CPC ..... F15B 19/005; E02F 9/2066; E02F 9/2246; E02F 9/267
(Continued)

(56) References Cited

U.S. PATENT DOCUMENTS 7,848,860 B2 * 12/2010 Saposnik ................ E02F 9/267
701/29.2
8,997,472 B2 *  4/2015 Suzuki ................... E02F 9/267
60/328

(Continued)

FOREIGN PATENT DOCUMENTS

AU      2010-228582 A1    9/2011
EP         1939363 A2    7/2008
(Continued)

OTHER PUBLICATIONS

Notification of Second Office Action issued by the State Intellectual Property Office of People's Republic of China (SIPO) on Jul. 22, 2016 regarding corresponding China Application No. 201180076010.8 (with English translation) (15 pages).
(Continued)

*Primary Examiner* — Michael Leslie
(74) *Attorney, Agent, or Firm* — Harness, Dickey & Pierce, P.L.C.

(57) ABSTRACT

An engine control system for a construction machine is disclosed, which can compulsorily stop engine driving when an attachment or the like malfunctions against an operator's intention during the operation of an excavator or the like. The engine control system includes a first step of determining whether pilot signal pressure, which is detected when at least one of an operation lever and a traveling pedal for respectively operating an attachment, a swing device, and a traveling device is operated, exceeds a first set pressure, and a second step of determining whether the pressure on the outlet side of a main hydraulic pump exceeds a second set pressure, wherein if the pilot signal pressure detected in the first step does not exceed the first pressure and the pressure of the main hydraulic pump detected in the second step
(Continued)

exceeds the second pressure, engine driving is compulsorily stopped by means of a control signal from the controller.

6 Claims, 2 Drawing Sheets

(51) Int. Cl.
*F15B 19/00* (2006.01)
*F02D 41/22* (2006.01)
*E02F 9/20* (2006.01)
*E02F 9/22* (2006.01)
*F02D 41/04* (2006.01)
*F02D 29/04* (2006.01)
*E02F 9/26* (2006.01)

(52) U.S. Cl.
CPC .......... *E02F 9/2285* (2013.01); *F02D 41/221* (2013.01); *F15B 19/005* (2013.01); *E02F 9/267* (2013.01); *F02D 29/04* (2013.01); *F02D 41/042* (2013.01); *F02D 2200/50* (2013.01); *F15B 2211/60* (2013.01); *Y02T 10/40* (2013.01)

(58) Field of Classification Search
USPC .......................................................... 60/403
See application file for complete search history.

(56) References Cited

U.S. PATENT DOCUMENTS

2011/0192156 A1    8/2011   Sato et al.
2013/0055886 A1    3/2013   Park et al.

FOREIGN PATENT DOCUMENTS

| JP | 2001-041069 A | 2/2001 |
| JP | 2005-002804 A | 1/2005 |
| JP | 2005-201133 A | 7/2005 |
| KR | 10-2011-0091467 A | 8/2011 |
| WO | WO-2010110021 A1 | 9/2010 |

OTHER PUBLICATIONS

International Search Report (in Korean and English) and Written Opinion (in Korean) for PCT/KR2011/010209, mailed Sep. 5, 2012; ISA/KR.

Extended European Search Report dated Jan. 5, 2016 regarding Application No. 11878350.5 in the European Patent Office (7 pages).

* cited by examiner

ENGINE CONTROL METHOD OF CONSTRUCTION MACHINE

TECHNICAL FIELD

The present invention relates to an engine control system for a construction machine. More particularly, the present invention relates to an engine control system for a construction machine, which can compulsorily stop engine driving when an attachment or the like malfunctions against an operator's intention during the operation of the construction machine, such as an excavator or the like.

BACKGROUND ART

As illustrated in FIG. 1, a hydraulic circuit of an excavator, to which the present invention is applied, includes a hydraulic pump 1 connected to an engine (not illustrated); an attachment 2, such as an arm, connected to the hydraulic pump 1 and a traveling motor 3; an operation lever (RCV lever) 4 and a traveling pedal (RCV pedal) 5 outputting a control signal in proportion to an operator's operation amount; a main control valve (MCV) 6 installed in a flow path between the hydraulic pump 1 and the attachment and a flow path between the hydraulic pump 1 and the traveling motor 3 to control a start, stop, and direction change of the attachment 2 and the traveling motor 3 when a corresponding spool is shifted; and a controller (ECU) 7 controlling a discharge flow rate of the hydraulic pump 1 according to an operation of the operation lever 4 or the traveling pedal 5.

In the excavator having the above-described hydraulic circuit, pilot signal pressure, which is supplied from a pilot pump (not illustrated) when an operator operates the operation lever 4, shifts a spool 8 for an attachment of the main control valve 6 through the operation lever 4. Through this, hydraulic fluid that is supplied from the hydraulic pump 1 is supplied to a boom cylinder through the spool to drive an attachment, such as a boom, an arm, or a bucket.

Further, if the operator presses the traveling pedal 5, the pilot signal pressure shifts the traveling spool 8 of the main control valve 6 through the pedal 5. Through this, left and right traveling motors are driven by the hydraulic fluid that is supplied from the hydraulic pump 1.

On the other hand, if the operation lever 4 or the traveling pedal 5 is operated and shifted to a neutral position in order to temporarily stop the traveling or operation of the equipment, the supply of the pilot signal pressure to the corresponding spool of the main control valve 6 is intercepted, and thus the spool returns to the neutral position. Through this, the hydraulic fluid that is discharged from the hydraulic pump 1 returns to a hydraulic tank 10, and thus the attachment such as the arm becomes unable to be operated.

On the other hand, in the case where a stick of the spool of the main control valve 6 occurs due to foreign substances or other damages, the spool of the main control valve 6 is kept in a shifted state even if the operator shifts the operation lever 4 to the neutral position to stop the operation of the equipment. Due to this, the flow path between the hydraulic pump 1 and the attachment 2 is kept open, and thus the hydraulic fluid that is discharged from the hydraulic pump 1 is continuously supplied to the attachment 2 along the flow path. Accordingly, the attachment of the equipment, such as the boom, continues traveling or swing operation.

As described above, if the spool of the main control valve 6 is in a specific condition (e.g., if the stick of the spool or valve inferiority occurs), the equipment may malfunction regardless of the operator's intention, and this may cause another operator or building surrounding the equipment to be secondarily damaged.

DISCLOSURE

Technical Problem

Therefore, an embodiment of the present invention is related to an engine control system for a construction machine, which can compulsorily stop engine driving when an attachment or the like malfunctions due to an unexpected cause, such as a stick of a spool of a main control valve, in a state where an operation lever is shifted to a neutral position during the operation of the equipment, and thus can prevent secondary damages that may be caused by the malfunction of the equipment against an operator's intention.

Technical Solution

In accordance with an aspect of the present invention, an engine control system for a construction machine including a lower driving structure, an upper swing structure mounted on the lower driving structure, an attachment mounted on the upper swing structure, a main hydraulic pump connected to an engine, a detection means for detecting pressure on an outlet side of the main hydraulic pump, a detection means for detecting whether the attachment, a traveling device, and a swing device operate, a main control valve, and a controller, includes a first step of determining whether pilot signal pressure, which is detected when at least one of an operation lever and a traveling pedal for respectively operating the attachment, the swing device, and the traveling device is operated, exceeds a first set pressure; and a second step of determining whether the pressure on the outlet side of the main hydraulic pump exceeds a second set pressure, wherein if the pilot signal pressure detected in the first step does not exceed the first pressure and the pressure of the main hydraulic pump detected in the second step exceeds the second pressure, engine driving is compulsorily stopped by means of a control signal from the controller.

The engine control system according to the aspect of the present invention may further include a pressure sensor which is assembled on a port for measuring pressure that is formed on a housing of the main hydraulic pump as a means for detecting pressure on an outlet side of the main hydraulic pump.

The engine control system according to the aspect of the present invention may further include a pressure sensor which is assembled on a port for measuring pressure that is installed on a hydraulic pipe for connecting the main hydraulic pump and the main control valve as a means for detecting pressure on an outlet side of the main hydraulic pump.

The engine control system according to the aspect of the present invention may further include a pressure sensor which is assembled on a pressure measurement port that is installed on a connection flow path of the main control valve connected to the main hydraulic pump as a means for detecting pressure on an outlet side of the main hydraulic pump.

The engine control system according to the aspect of the present invention may further include a pressure sensor which detects pilot signal pressure that is input to a spool of the main control valve and transmits a detection signal to the controller as a means for detecting the operation when at least one of the operation lever and the traveling pedal for respectively operating the attachment, the swing device, and the traveling device is operated.

The engine control system according to the aspect of the present invention may further include a pressure switch which is turned on/off to generate a signal when pilot signal pressure that is input to a spool of the main control valve reaches a predetermined pressure as a means for detecting the operation when at least one of the operation lever and the traveling pedal for respectively operating the attachment, the swing device, and the traveling device is operated.

The operation lever and the traveling pedal for respectively operating the attachment, the swing device, and the traveling device may output electrical signal values according to their operations; and a means for detecting whether the operation lever and the traveling pedal for respectively operating the attachment, the swing device, and the traveling device are operated may detect their operations according to the electrical signal values output therefrom and may transmit a detection signal to the controller.

Advantageous Effect

The engine control system for a construction machine as configured above according to the present invention has the following advantages.

If the attachment or the like malfunctions against the operator's intention due to the spool stick or inferiority of the main control valve in a state where the operation lever is shifted to the neutral position during the operation of the equipment, the engine driving is compulsorily stopped, and thus damages of the surrounding operator or building that may be caused by the malfunction of the equipment and a loss of property due to the damage of the equipment can be prevented.

BRIEF DESCRIPTION OF THE DRAWINGS

The above objects, other features and advantages of the present invention will become more apparent by describing the preferred embodiments thereof with reference to the accompanying drawings, in which.

DESCRIPTION OF REFERENCE NUMERALS IN THE DRAWING

Figure 1:
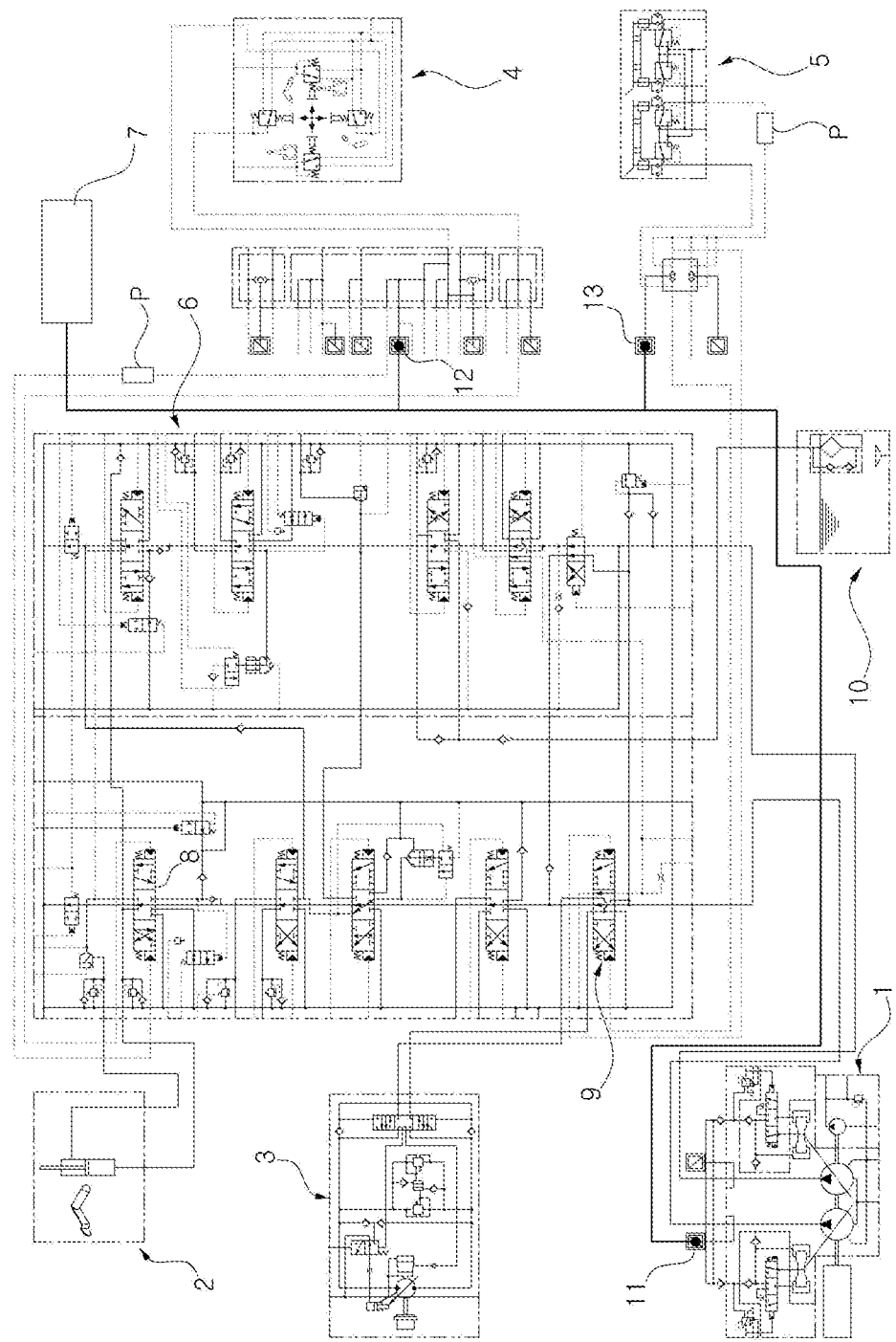
FIG. 1 is a hydraulic circuit diagram of a hydraulic system of an excavator to which the present invention is applied.

1: hydraulic pump
2: attachment
3: traveling motor
4: operation lever
5: traveling pedal
6: main control valve
7: controller
8: spool for attachment
9: traveling spool
10: hydraulic tank
11, 12, 13: pressure sensor

BEST MODE

Hereinafter, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 2:
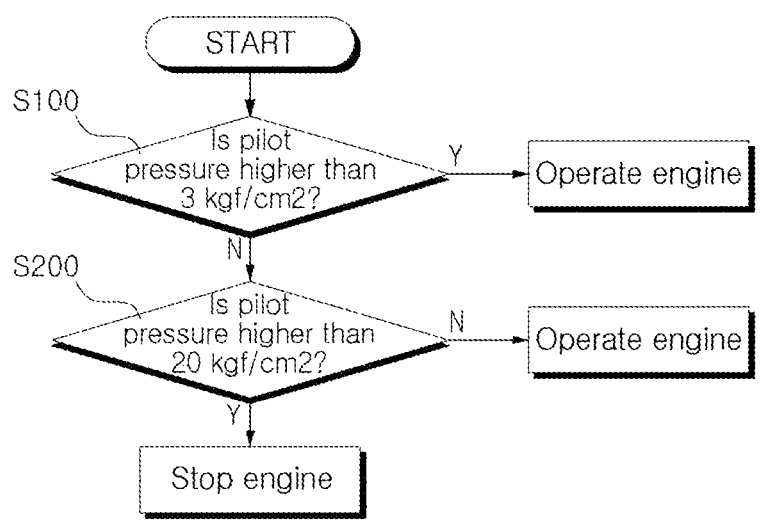
FIG. 2 is a flowchart illustrating an engine control system for a construction machine according to an embodiment of the present invention.

According to an embodiment of the present invention as illustrated in FIGS. 1 and 2, an engine control system for a construction machine including a lower driving structure, an upper swing structure mounted on the lower driving structure, an attachment mounted on the upper swing structure, a main hydraulic pump connected to an engine, a detection means for detecting pressure on an outlet side of the main hydraulic pump, a detection means for detecting whether the attachment, a traveling device, and a swing device operate, a main control valve, and a controller (ECU), includes a first step S100 of determining whether pilot signal pressure, which is detected when at least one of an operation lever (RCV lever) 4 and a traveling pedal (RCV pedal) 5 for respectively operating the attachment 2, the swing device (not illustrated) including a swing motor, and the traveling device including a traveling motor 3 is operated, exceeds a first set pressure; and a second step S200 of determining whether the pressure on the outlet side of the main hydraulic pump 1 exceeds a second set pressure, wherein if the pilot signal pressure detected in the first step S100 does not exceed the first pressure and the pressure of the main hydraulic pump 1 detected in the second step S200 exceeds the second pressure, engine driving is compulsorily stopped by means of a control signal from the controller 7.

The engine control system may further include a pressure sensor which is assembled on a port for measuring pressure that is formed on a housing (not illustrated) of the main hydraulic pump 1 as a means for detecting pressure on an outlet side of the main hydraulic pump 1.

The engine control system may further include a pressure sensor which is assembled on a port for measuring pressure that is installed on a hydraulic pipe for connecting the main hydraulic pump 1 and the main control valve (MCV) 6 as a means for detecting pressure on an outlet side of the main hydraulic pump 1.

The engine control system may further include a pressure sensor which is assembled on a pressure measurement port that is installed on a connection flow path of the main control valve 6 connected to the main hydraulic pump 1 as a means for detecting pressure on an outlet side of the main hydraulic pump 1.

The engine control system may further include a pressure sensor which detects pilot signal pressure that is input to a spool of the main control valve 6 and transmits a detection signal to the controller (ECU) 7 as a means for detecting the operation when at least one of the operation lever 4 and the traveling pedal 5 for respectively operating the attachment 2, the swing device, and the traveling device is operated.

The engine control system may further include a pressure switch which is turned on/off to generate a signal when pilot signal pressure that is input to a spool of the main control valve 6 reaches a predetermined pressure as a means for detecting the operation when at least one of the operation lever 4 and the traveling pedal 5 for respectively operating the attachment 2, the swing device, and the traveling device is operated.

The operation lever 4 and the traveling pedal 5 for respectively operating the attachment 2, the swing device, and the traveling device may output electrical signal values according to their operations; and a means for detecting whether the operation lever 4 and the traveling pedal 5 for respectively operating the attachment 2, the swing device, and the traveling device are operated may detect their operations according to the electrical signal values output therefrom and may transmit a detection signal to the controller 7.

Hereinafter, a use example of the engine control system for a construction machine according to an embodiment of the present invention will be described in detail with reference to the accompanying drawings.

When an attachment of an excavator is operated, the spool of the main control valve 6 is shifted, and the opening pressure thereof, which may slightly differ depending on the kind of the equipment or respective hydraulic actuators (for a boom, an arm, a bucket, and a traveling motor), is about 6 kgf/cm². That is, even in the case where the operation lever 4 or the traveling pedal 5 is slightly operated at an initial stage, the pilot signal pressure P that is input to the spool of the main control valve 6 becomes about 6 kgf/cm² or less. Due to this, the spool of the main control valve 6 is not opened, and thus the attachment, such as the boom, is not driven.

Further, in the case where the hydraulic actuator is not driven, the discharge flow rate of the main hydraulic pump 1 entirely returns to the hydraulic tank 10. In this case, only the resistance of line remains, and thus the pilot signal pressure typically becomes about 10 kgf/cm² or less.

Detection signals which are detected by a pressure sensor 11 for detecting pressure on the outlet side of the main hydraulic pump 1, a pressure sensor 13 for detecting the pilot signal pressure according to the operation of the traveling pedal 5, and a pressure sensor 12 for detecting the pilot signal pressure according to the operation of the operation lever 4 are transmitted to the controller 7.

In the case where the pressure values detected by the pressure sensors 12 and 13 according to the operation of the operation lever 4 or the traveling pedal 5 are equal to or lower than 3 kgf/cm² in consideration of an influence exerted by vibration of the equipment (in this case, it is determined that the operator has no intention to operate the equipment), in the case where the pressure value detected by the pressure sensor 11 for detecting the pressure of the main hydraulic pump 1 is equal to or higher than 20 kgf/cm², or in the case where the above-described two conditions are simultaneously satisfied, the controller compulsorily outputs the control signal to stop the engine driving. Through this, a secondary damage due to malfunction of the equipment regardless of the operator-s intention can be prevented.

As illustrated in FIGS. 1 and 2, it is determined whether the pilot signal pressure that is input to the spool of the main control valve 6, which is detected by the pressure sensors 12 and 13, is equal to or higher than 3 kgf/cm². If the pilot signal pressure is lower than 3 kgf/cm², the controller 7 proceeds to the next step (see S200), while if the pilot signal pressure exceeds 3 kgf/cm², the controller 7 maintains the engine operation (see S100).

That is, if the pilot signal pressure that is input to the spool of the main control valve 6 is lower than 3 kgf/cm² and the pressure on the outlet side of the main hydraulic pump 1 is higher than 20 kgf/cm², the controller 7 determines that the main control valve 6 is in a specific condition, such as a spool stick, and compulsorily outputs the control signal to the engine driving portion to stop the engine. In contrast, if the pilot signal pressure that is input to the spool of the main control valve 6 is lower than 3 kgf/cm² and the pressure on the outlet side of the main hydraulic pump 1 is lower than 20 kgf/cm², the controller 7 maintains the engine driving.

Referring to the flowchart of FIG. 2, a normal driving state of the equipment and turning-off of the engine driving will be described.

A) If the pilot signal pressure that is input to the main control valve 6 is higher than 3 kgf/cm², the controller 7 maintains the normal operation state of the equipment.

B) If the pilot signal pressure that is input to the spool of the main control valve 6 is lower than 3 kgf/cm² and the pressure of the main hydraulic pump 1 is higher than 20 kgf/cm², the controller 7 compulsorily turns off the engine driving.

C) If the pilot signal pressure that is input to the spool of the main control valve 6 is lower than 3 kgf/cm² and the pressure of the main hydraulic pump 1 is lower than 20 kgf/cm², the controller 7 maintains the normal operation state of the equipment.

That is, in the case of A) and C), the controller 7 maintains the normal operation state of the equipment, while in the case of B), the controller 7 determines that the equipment is out of order and compulsorily stops the engine driving.

INDUSTRIAL APPLICABILITY

According to the present invention having the above-described configuration, if the attachment malfunctions due to the unexpected cause, such as the spool stick, in a state where the operation lever is shifted to the neutral position during the operation of the equipment, the engine driving is compulsorily stopped, and thus the damage of the equipment and a loss of lives, which may be caused by the turnover of the equipment due to the malfunction of the equipment against the operator's intention, can be prevented.

The invention claimed is:

1. An engine control system for a construction machine including a lower driving structure, an upper swing structure mounted on the lower driving structure, an attachment mounted on the upper swing structure, a main hydraulic pump connected to an engine, a detection means for detecting pressure on an outlet side of the main hydraulic pump, a detector for detecting whether the attachment, a traveling device, and a swing, device are intended to operate a main control valve, and a controller, the engine control system comprising:

determining whether pilot signal pressure, which is detected when at least one of an operation lever and a traveling pedal for respectively operating the attachment, the swing device, and the traveling device is operated, exceeds a first set pressure; and determining whether the pressure on the outlet side of the main hydraulic pump exceeds a second set pressure, wherein if the pilot signal pressure detected in the first step does not exceed the first pressure and the pressure of the main hydraulic pump detected in the second step exceeds the second pressure, engine driving is compulsorily stopped by means of a control signal from the controller.

2. The engine control system according to claim 1, further comprising a pressure sensor which is assembled on a port for measuring pressure that is formed on a housing of the main hydraulic pump as the means for detecting pressure on an outlet side of the main hydraulic pump.

3. The engine control system according to claim 1, further comprising a pressure sensor which is assembled on a port for measuring pressure that is installed on a hydraulic pipe for connecting the main hydraulic pump and the main control valve as the means for detecting pressure on an outlet side of the main hydraulic pump.

4. The engine control system according to claim 1, further comprising a pressure sensor which is assembled on a pressure measurement port that is installed on a connection flow path of the main control valve connected to the main hydraulic pump as the means for detecting pressure on an outlet side of the main hydraulic pump.

5. The engine control system according to claim 1, further comprising a pressure sensor which detects pilot signal pressure that is input to a spool of the main control valve and transmits a detection signal to the controller as the detector for detecting the operation when at least one of the operation lever and the traveling pedal for respectively operating the attachment, the swing device, and the traveling device is operated.

6. The engine control system according to claim 1, further comprising a pressure switch which is turned on/off to generate a signal when pilot signal pressure that is input to a spool of the main control valve reaches a predetermined pressure as the detector for detecting the operation when at least one of the operation lever and the traveling pedal for respectively operating the attachment, the swing device, and the traveling device is operated.

* * * * *